March 14, 1961 B. W. FOSTER 2,974,855
SQUARE FREE PISTON ENGINE
Filed Sept. 23, 1957 8 Sheets-Sheet 1

INVENTOR.
BERRY W. FOSTER
BY
ATTORNEY

March 14, 1961 B. W. FOSTER 2,974,855
SQUARE FREE PISTON ENGINE
Filed Sept. 23, 1957 8 Sheets-Sheet 3

INVENTOR.
BERRY W. FOSTER
BY
ATTORNEY

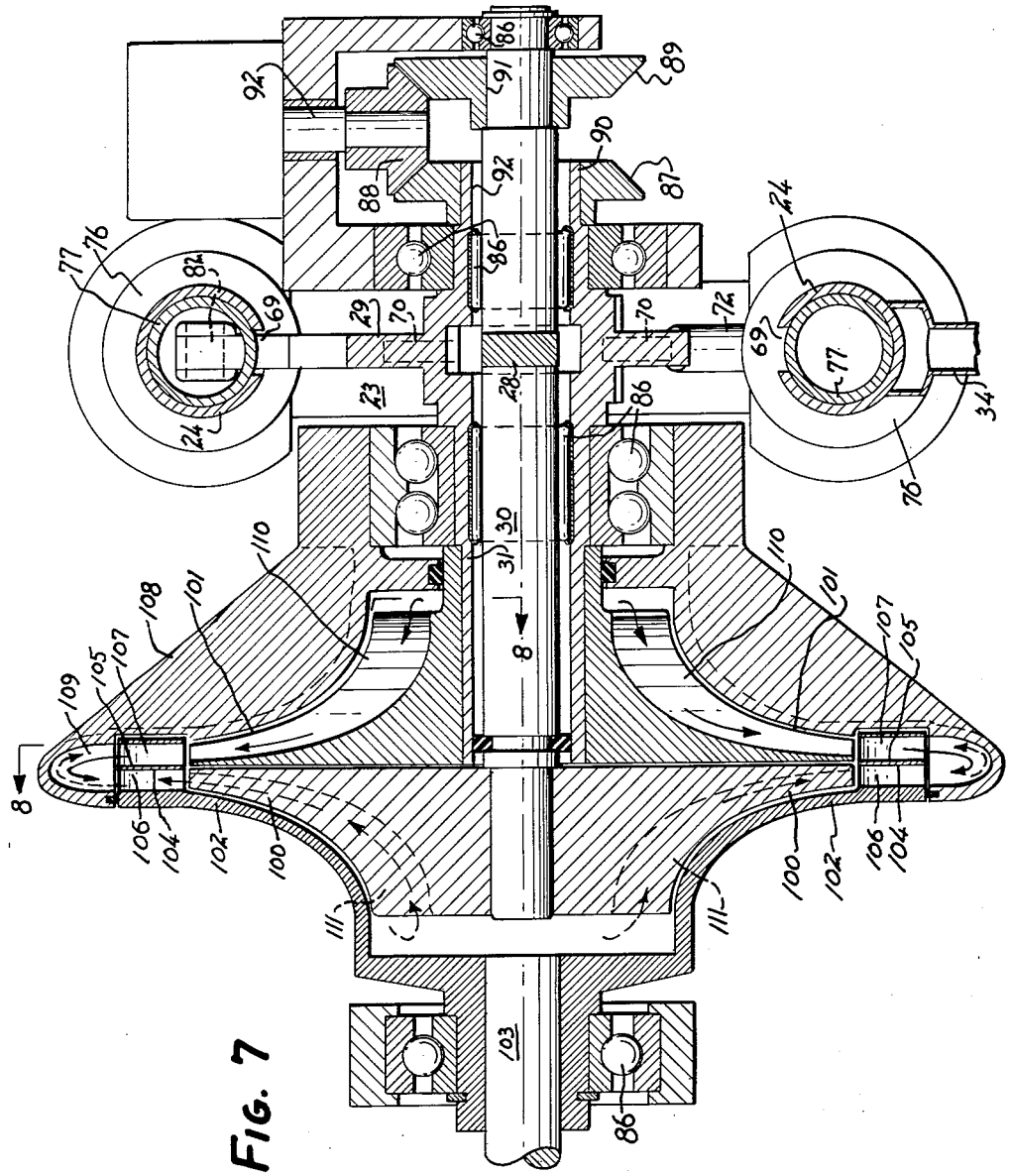

March 14, 1961 B. W. FOSTER 2,974,855
SQUARE FREE PISTON ENGINE
Filed Sept. 23, 1957 8 Sheets-Sheet 7

INVENTOR.
BERRY W. FOSTER
BY
ATTORNEY

March 14, 1961     B. W. FOSTER     2,974,855
SQUARE FREE PISTON ENGINE
Filed Sept. 23, 1957     8 Sheets-Sheet 8
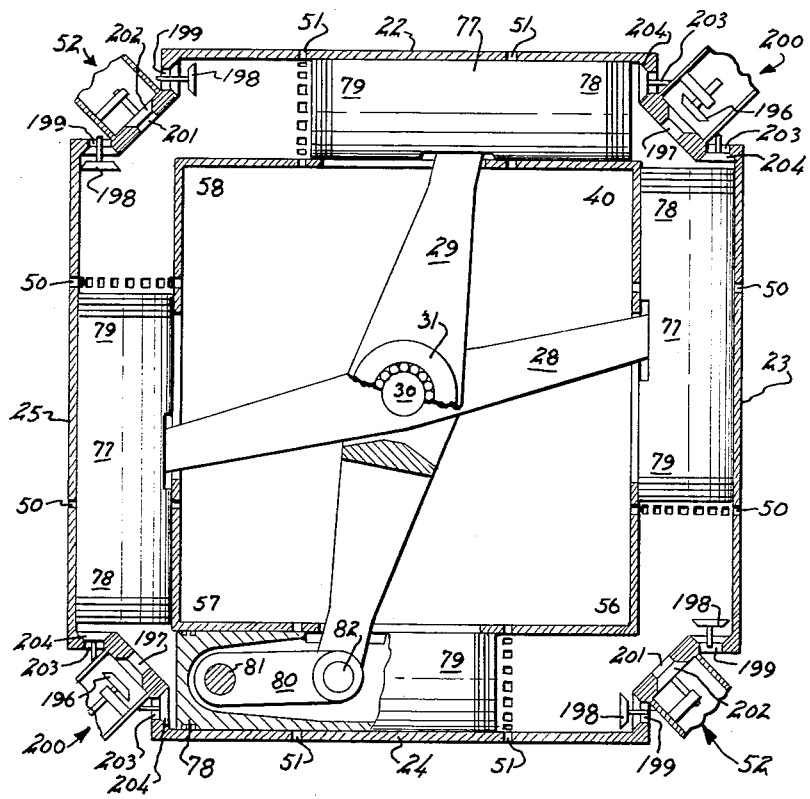
FIG. 12
INVENTOR.
BERRY W. FOSTER
BY 
ATTORNEY United States Patent Office 2,974,855
Patented Mar. 14, 1961

2,974,855
SQUARE FREE PISTON ENGINE
Berry W. Foster, 25788 E. Manning Ave., Orange Cove, Calif.
Filed Sept. 23, 1957, Ser. No. 685,641
7 Claims. (Cl. 230—56)

This invention relates to a novel free piston engine of the classical Otto or diesel cycle and preferably of the two-stroke type. It also relates to a novel compressor of similar structure. More particularly, the invention relates to a novel form of engine or compressor with four cylinders arranged in a square, each cylinder having a pair of double-acting pistons arranged in a novel configuration to obtain important new results. The invention also includes power-take-off means for the engine.

One important feature of this present invention is the great reduction in the number of mechanical wearing parts as compared with the conventional crankshaft-piston-connecting-rod engine. For example, a conventional eight-cylinder engine of the crank-and-rod type has from 25 to 32 bearings with radial loads. One form of eight-piston engine or compressor of my invention has only 16 bearings with radial loads, while another form has only 8 bearings with radial loads in the entire eight-piston engine; yet as to power, efficiency, fuel consumption, etc., my new engine is favorably comparable to the conventional engine in every way. By reducing the number of bearings with radial loads, wear in my new engine may be minimized. The side loads on the cylinder walls of my engine are but a fraction of the corresponding side loads on the cylinder walls of a conventional engine. As a result, the new engine needs overhaul less frequently than conventional engines, requires less maintenance between overhauls, and generally operates more economically.

Another example of the reduction of parts achieved by my invention is that an eight-piston engine of my invention has only four fuel injectors and associated mechanisms, while conventional eight-cylinder engines have eight fuel injectors and associated mechanisms.

Another features of the engine of my invention is the complete elimination of the poppet valves, cam shafts, gears, and other mechanisms that are used in conventional engines to close the intake and exhaust cylinder ports. This is possible because the pistons themselves open and close these ports, in my new engine. Moreover, sleeve ports are arranged to give a clean sweep for fresh scavenging air to go through each cylinder and combustion chamber.

Another unusual feature of my new engine or compressor is that its connecting rods exert side loads on the cylinder less than ten percent of those exerted in a conventional crank-and-rod engine. The reason for this will be made clear in an explanation of the structure of the invention, and it will suffice in these preliminary remarks to point out that the piston of my engine transmits a pure torque load to engine power levers, so that there are no radial bearing loads on the synchronous gear mechanism or the torque converter mechanism.

Another remarkable advantage of my new engine is its extraordinary light weight, due not only to the elimination of many parts but also the fact that it is a two-stroke double-acting engine. It weighs only a fraction of a single-acting four-stroke type of engine of comparable power. My new engine may be designed to have one horse power or more per pound of engine weight.

Perhaps the most striking characteristic of my new engine is its novel arrangement of each group of four cylinders in the form of a square. Each cylinder is provided with two pistons (or one double-acting piston) which are joined together so that they always move in the same direction, which is toward and away from the corners of the square. The adjacent cylinders of the square—i.e., those that converge on any one corner—have their pistons timed to move toward the corner and toward each other simultaneously and then to move away from the corner and from each other simultaneously. The pistons in parallel cylinders assembly move parallel to each other and in the opposite direction by means of a mechanical linkage which joins them, including levers which pivot at the center of the square. The levers are joined to the pistons by means of a novel connecting-rod or toggle-rod structure, so arranged that there will be a minimum side load on the cylinder when the maximum torque is being delivered to the levers. The levers then transmit the power from the reciprocating pistons to a pair of rocking shafts.

Part of the power output is represented by the excess of the expanded gas over that necessary to drive the pistons and rock the shafts. This part is utilized in the present invention in a turbine or similar device.

An important part of the invention is a novel torque converter for utilizing the torque produced by the rocking of the shafts by changing the rocking motion into rotary motion. In a conventional piston engine the reciprocating motion of the piston is converted into unidirectional rotation by means of the crankshaft, connecting rods, etc. Since the present invention uses substantially free pistons whose reciprocating motion is transmitted as an oscillation of a pair of power shafts, the resultant torque must be converted in a different manner. In this invention this oscillating shaft power is delivered directly to the torque converter, which may be an electric generator or a fluid pump. Both are of novel construction. In the generator, the oscillating motion is used to generate electricity directly by the relative motion of magnetic fields. In the fluid pump the oscillating motion forces fluid through a unidirectional turbine.

Other objects and advantages of the invention will appear from the following detailed description of some preferred embodiments thereof.

Figure 6:
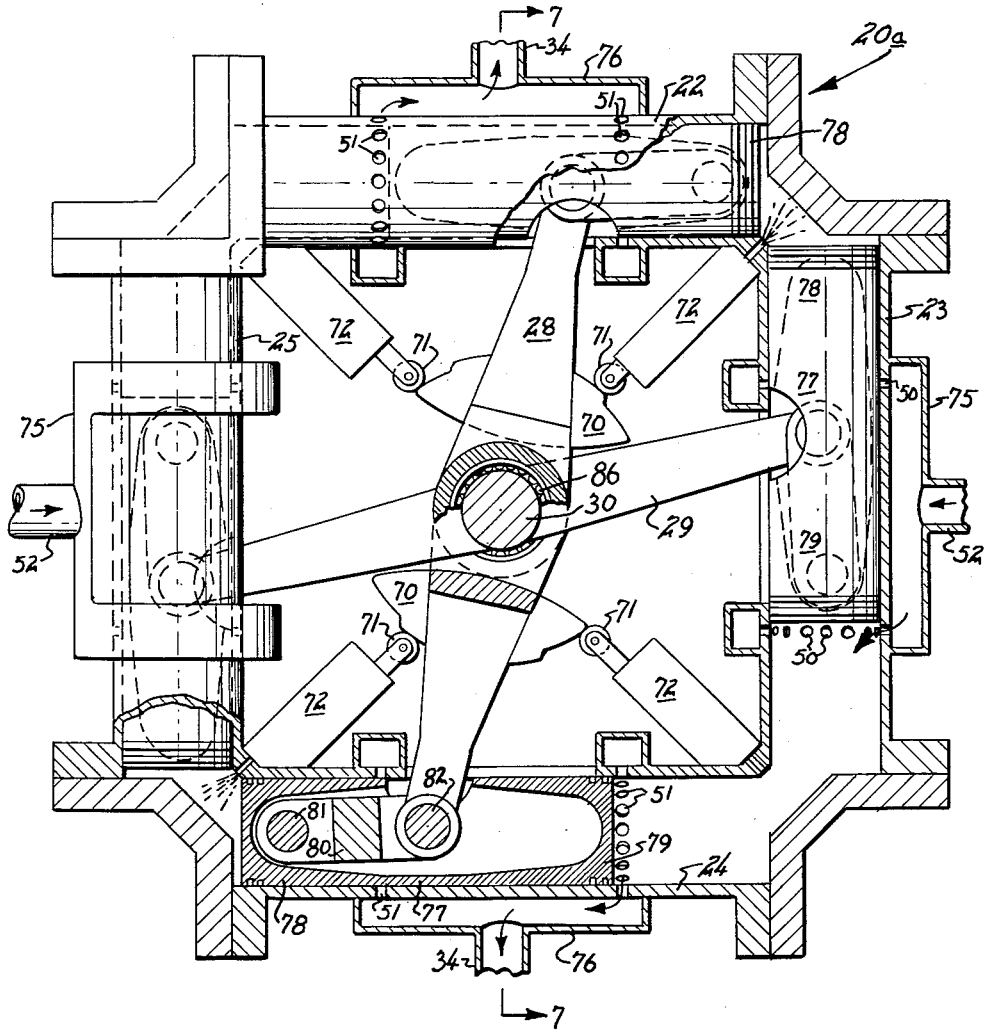
Fig. 6 is a view in section of an alternate design for the square engine on the left side of Fig. 1, which embodies a modified form of the invention as compared with the engine of Figs. 2–5. The view is taken along the line 6—6 in Fig. 7.

In the drawings:

Fig. 7 is a view in section, taken along the line 7—7 of Fig. 6, showing also a novel torque converter using a fluid pump and a unidirectional turbine.

Figure 8:
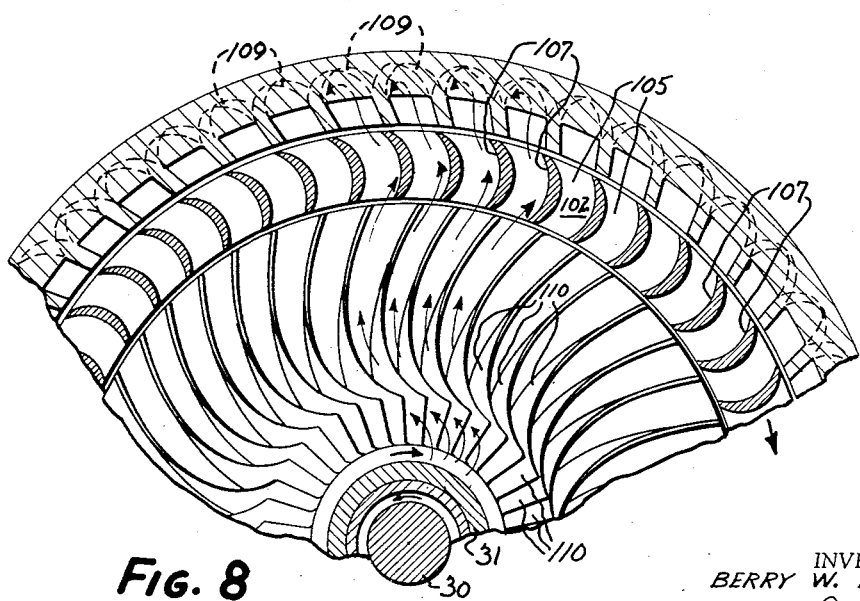

Fig. 8 is a fragmentary view in section taken along the line 8—8 of Fig. 7 and showing the structure of the turbine blades.

Figure 9:
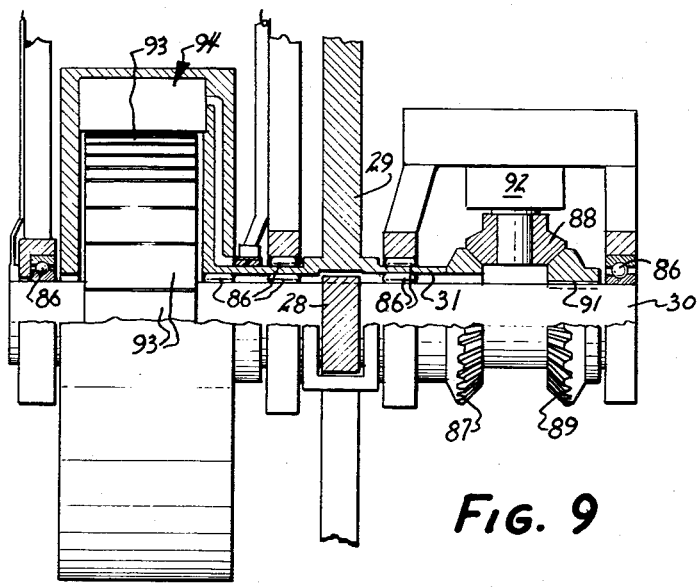

Fig. 9 is a view in section showing an alternating current generator as driven by the rocking shafts.

Figure 10:
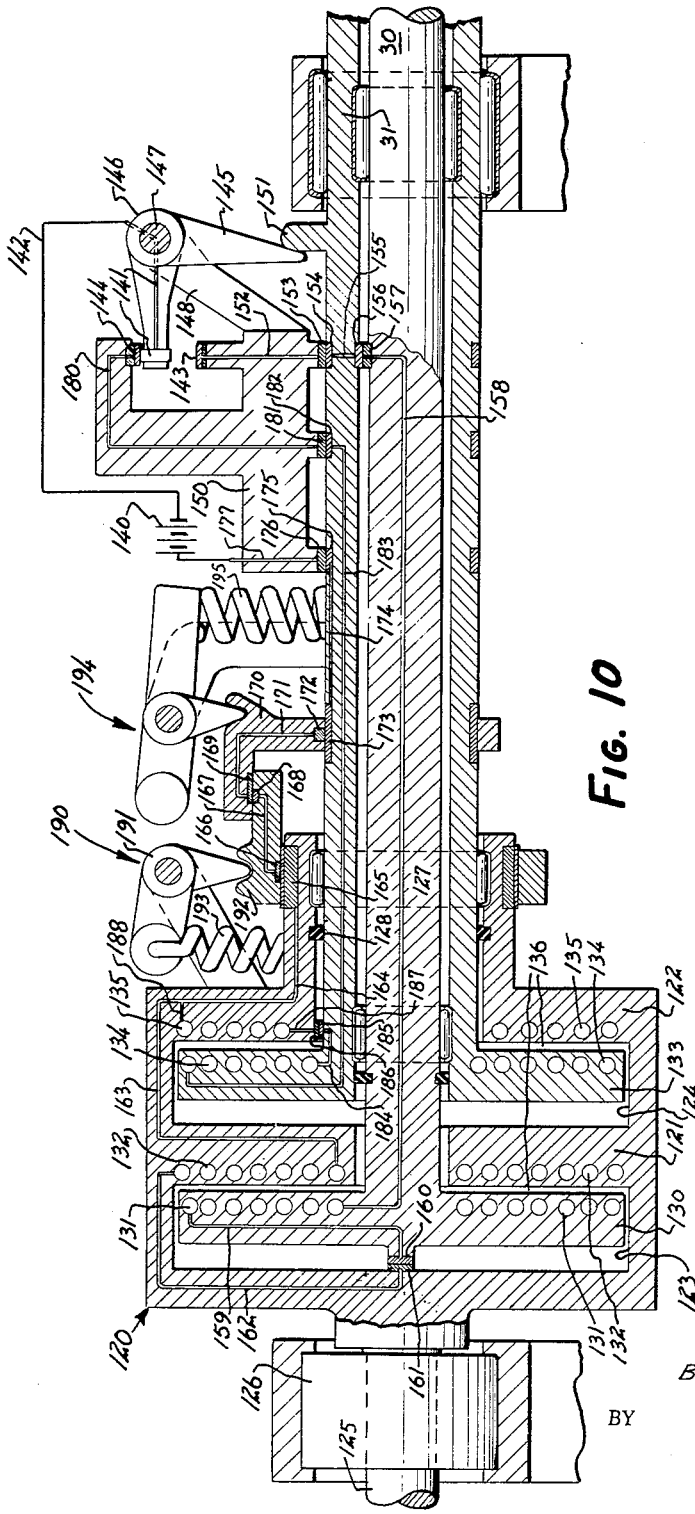

Fig. 10 is a view in elevation and in section of another form of torque converter for use with the present invention, including a magnetic clutch.

Figure 11:
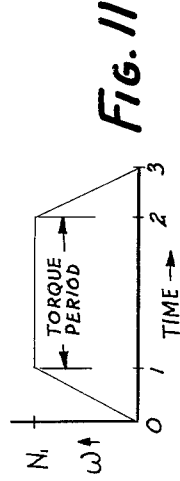

Fig. 11 is a power diagram of the torque converter cycle for the device of Fig. 10.

Figure 1:
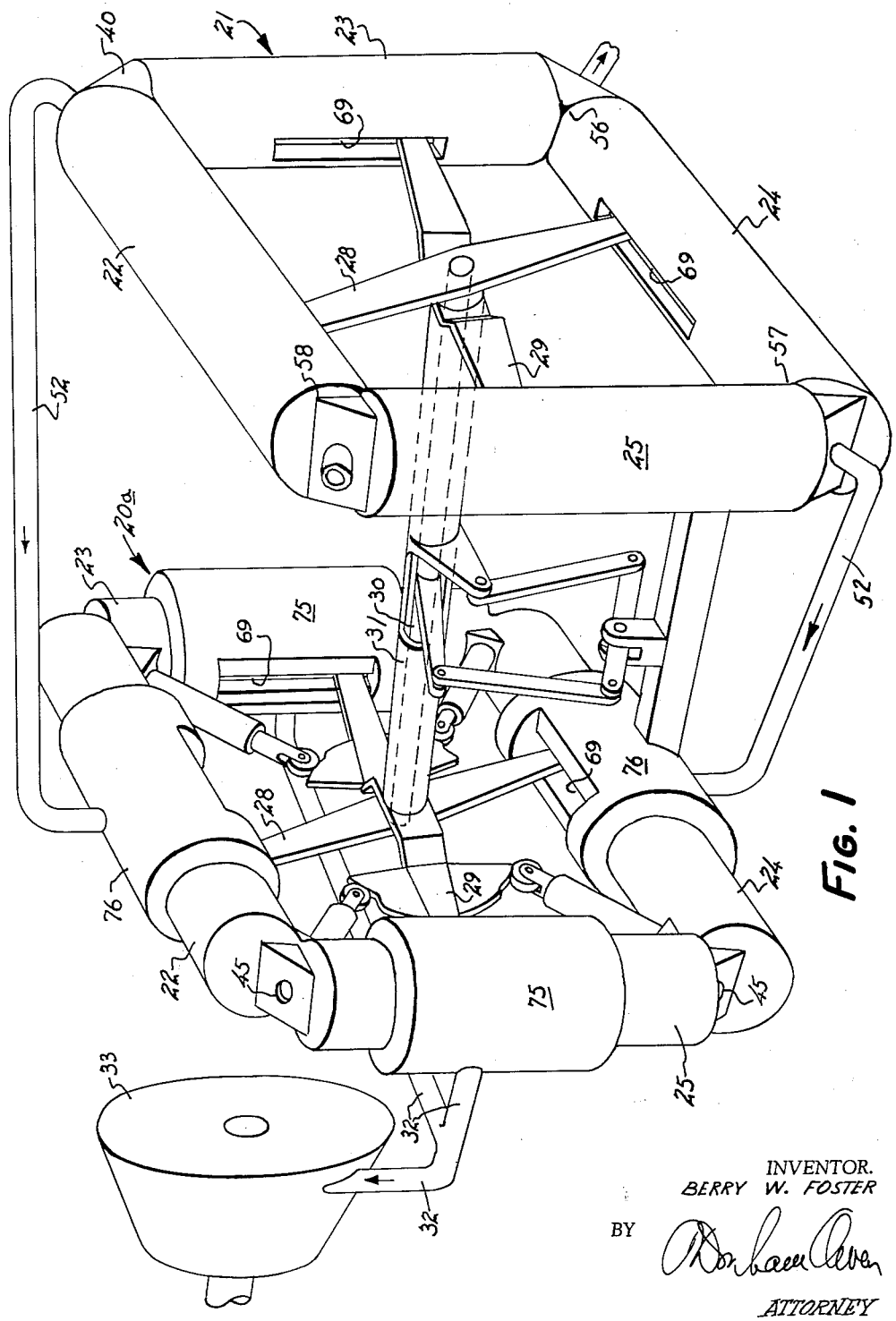
Fig. 1 is an isometric view of an engine and compressor comprising a square engine embodying the principles of the present invention used in a combination with a square air compressor of similar design.

Fig. 12 is a view in section of the compressor on the right side of Fig. 1.

*General description of the engine-compressor combination of Fig. 1*

A characteristic feature of my invention is that the engine or compressor is constructed in units, each comprising a square 20, 20ª, or 21. There may be only one square, and there may be as many as desired. Each square 20 or 20ª and 21 comprises four cylinders 22, 23, 24, and 25, and each cylinder is provided (see Fig. 2) with two pistons 26 and 27 (or one double-acting piston), the stroke of each piston being relatively short and lying within one end of its cylinder. Therefore, each square engine 20 or 20ª or square compressor 21 is, operationally, an eight-cylinder engine or compressor.

Each pair of pistons 26, 27 is joined to one end of one double-ended lever or connecting rod 28, 29. The pistons in the opposite cylinders 22 and 24 are joined to opposite ends of one lever or connecting rod 28, while the pistons in the other opposite pair of cylinders 23 and 25 are joined to opposite ends of another lever or connecting rod 29. The levers 28 and 29 pivot at the center of the square where they are respectively connected to concentric rock shafts 30 and 31.

Thus, the back-and-forth movement of the engine pistons 26, 27 is converted by the levers 28, 29 into rocking movement of the shafts 30 and 31, the shafts always being 180° out of phase. This rocking oscillation of the shafts 30, 31 by the engine 20ª may be used to move the pistons 78, 79 (Fig. 12) in the compressor 21; or it may be converted to rotary power by a torque converter (Figs. 7–11). Meanwhile, exhaust gases from the square engine 20ª may be conducted through conduits 32 to a gas turbine 33 which may operate a compressor for supercharging the engine. Also, additional power may be taken from this turbine 33.

The structure and operation will be better understood from the following more detailed examination, beginning with the cylinder and piston arrangement of an engine 20 similar to the engine 20ª.

*The cylinder and piston arrangement of the engine 20 (Figs. 1–5)*

Figure 2:
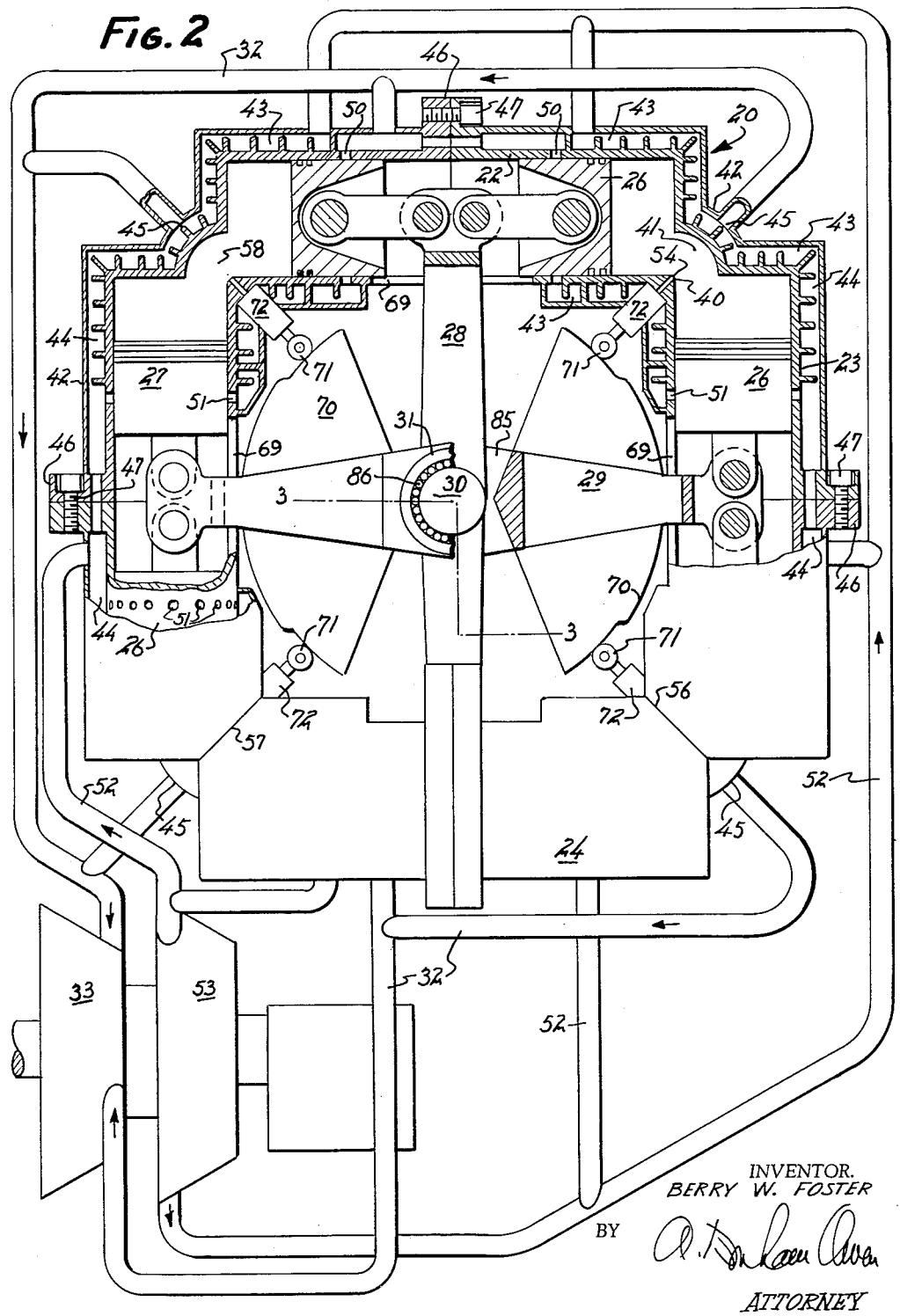
Fig. 2 is a view in elevation and partly in section of the square engine at the left side of Fig. 1, illustrated in its dead-center position, a connection to a turbine being shown in somewhat diagrammatic fashion.

The square engine 20 is shown in elevation and partly in section in Fig. 2. The engine cylinders 22 and 23 meet at a V-corner 40, and there I provide a combustion chamber 41 that joins the two cylinders 22 and 23. An engine cylinder head 42 covers the cylinders 22, 23, 24, 25, in four corner-centered segments. Hollow external cooling air passages 43 and 44 in one half of each segment are joined to the compressor discharge 52 along the top and bottom cylinders 22, 24.

At a port 45, preferably located at the corners, the external cooling air flows from passages 43 and 44 into the engine exhaust line 32. The other half of each segment has the same type of ducted external engine cooling. Additional ports 50 also connect the engine cylinder 22 to the exhaust conduits 32. Air intake ports 51, jacketed by the head 42, connect the passages 43 and 44 to conduits 52 for supercharged air. The conduits 52 may be connected to a supercharger 53, which may be powered by the turbine 33 or may be independently powered.

At the corner 40 is a fuel injector nozzle 54, and there may be a spark ignition (not shown) or diesel ignition (as shown).

The three other corners 56, 57, and 58 are substantially identical to the corner 40, and corresponding parts have been given identical numbers.

The engine cylinders 22, 23, 24, and 25 may be built up from four V's with about a 90° angle at the corners 40, 56, 57, and 58. These cylinders may be secured together at flanges 46 located near the center of the cylinders by bolts 47.

The pistons 26, 27 on the opposite sides 22, 24 and 23, 25 of the square cylinder assembly 20 are moved parallel to each other and symmetrically in opposite directions by means of the mechanical linkages joining them, including principally the levers 28 and 29. This mechanical means synchronizes the pistons, so that at the corner 40 the two pistons 26 move symmetrically toward and away from each other; the other two pistons 26 move in the same manner at the corner 57. When the pistons 26 at corners 40 and 57 are moving toward each other, the pistons 27 are moving symmetrically away from their corners 56 and 58, and vice versa.

Figure 5:
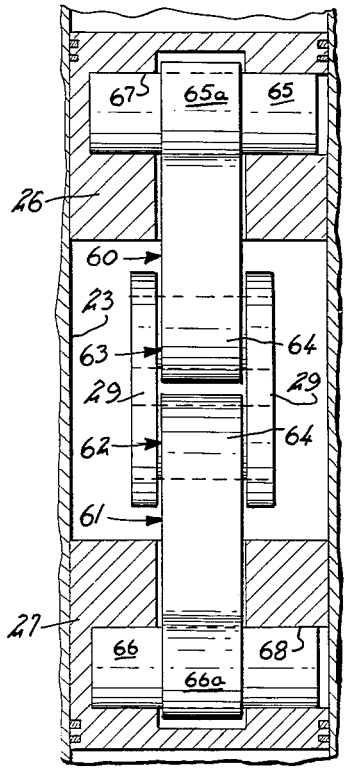
Fig. 5 is an enlarged view in section, taken along the line 5—5 of Fig. 4, showing the connection between the two pistons in one cylinder and the lever which connects them to one of the rocking shafts.
Figure 4:
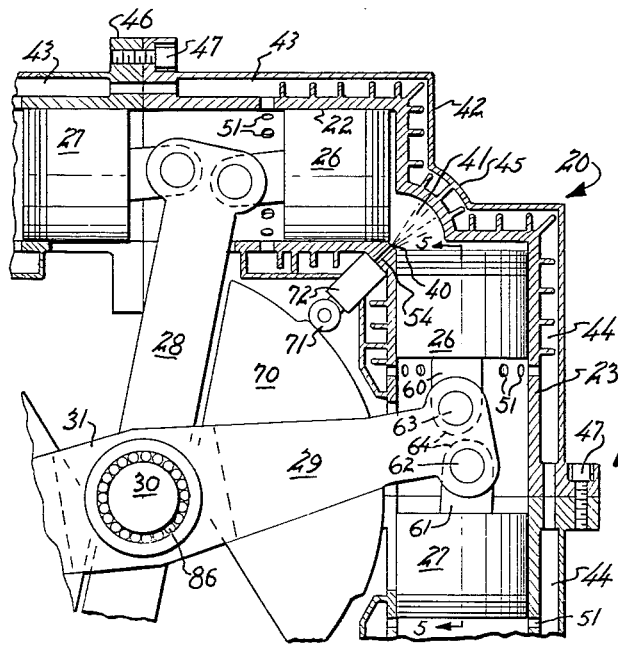
Fig. 4 is a view similar to Fig. 3, showing the pistons at the inner end of their stroke, with fuel being injected into the combustion chamber.

The levers 28, 29 are joined to their pistons 26 and 27 at each end by means of toggle rods 60, 61 as shown in Fig. 5. Each toggle rod rod 60, 61 has a pinned joint 62, 63 that is journaled in the lever 29. Stub shafts 65, 66 are rigidly secured to or are part of the outer ends of the toggle rods 60, 61 and they are journaled in openings 67, 68 in the pistons 26, 27. The levers 28, 29 extend through slotted openings 69 through the cylinders. As a result of this arrangement, there is a minimum side load on the pistons 26, 27 when the maximum torque is being delivered to the levers 28, 29. This side load is, in fact, about one-tenth or less of that in a conventional crank-and-rod engine.

There are sixteen bearings with radial loads as follows: eight bearings of type 64, which form the pinned joints 62 and 63 for the levers 28 and 29 and links 60 and 61; four bearings of type 65ª, which form a pinned joint between the stub shaft 65 and link 60; and four bearings of type 66ª, which form a pinned joint between the stub shaft 66 and link 61.

Fuel injectors 72 (and ignition sparks if used) may be operated and synchronized by cams 70 that may be secured to the lever 29 (or to the lever 28) if desired. Timing is thus positive, because the levers 29 are always in exact synchronization with their pistons 26, 27. Thus the timing is determined by the piston position. (If desired, an electric or photoelectric timing mechanism may be used instead.) Cam followers 71 ride the cams 70 and actuate the injectors 72 to send fuel into the nozzle 54 at the proper time (see Fig. 4).

*Operation of the pistons 26, 27 in cylinders 22, 23, 24, 25 (Figs. 3–4)*

Figure 3:
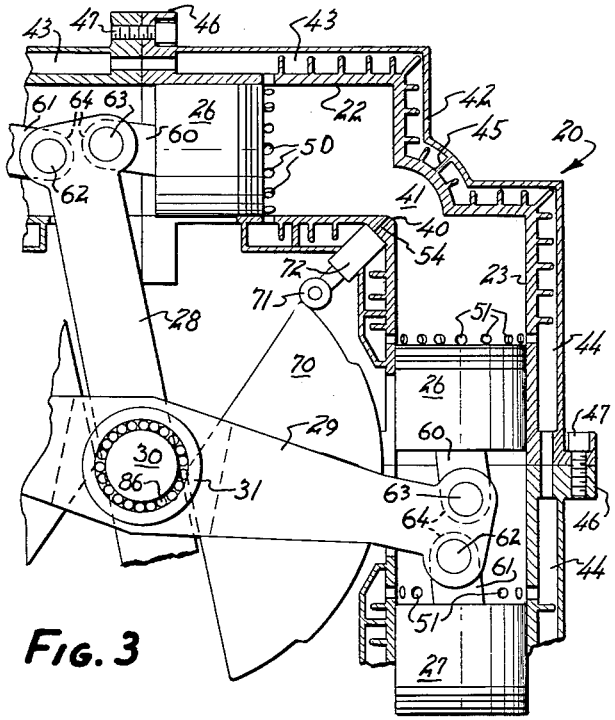
Fig. 3 is a fragmentary view in section of one corner of the square engine of Fig. 2, showing the adjacent pistons at the outer end of their strokes.

When the pistons 26, 26 on opposite sides of the corner 40 are in the position shown in Fig. 3, the sleeve ports 50 and 51 are uncovered. The supercharger 53 then forces a fresh charge of air into the cylinder 23 through the intake ports 51 and scavenges the burnt air in that end of the cylinder 23, the combustion chamber 41 and that end of the cylinder 22, expelling it through the exhaust ports 50. The exhaust gas may be conducted by the conduits 32 to the turbo-supercharger or turbine 33 where it expands and drives the turbine 33 and also drives the supercharger 53 that supplies the fresh air.

Meanwhile, a power stroke on the pistons 27 begins to force the pistons 26 toward each other in their compression stroke, covering the sleeve ports 50, 51 and compressing the fresh air sent in by the supercharger 53. The air is compressed toward the corner 40 in the combustion chamber 41.

As the pistons 26, 26 approach each other at the end of their strokes (Fig. 4) the adjacent cam follower 71 rides up on the high part of the cam 70, actuating the injector 72 to send fuel through the nozzle 54. Thus, when the pistons 26 reach their extreme position, shown in Fig. 4, fuel is injected through the nozzle 54 and is ignited and burned in the compressed air. This combustion may be a constant-volume process, a constant-pressure process, or a combination process.

The resultant burning of the fuel expands the gas in the combustion chamber 41 and in the ends of the cylinders 22, 23, acting on the pistons 26 to move them symmetrically away from each other and to drive the pistons 27 toward each other, completing the cycle, which is then repeated.

What takes place at the corner 40 is duplicated simultaneously at the corner 57, while the corners 56 and 58 are 180° out of phase therefrom (and in phase with each other) and act in the same manner at the proper time.

It will be noted that the intake and exhaust cylinder ports 51, 50 are covered and opened by the motion of the pistons 26, 27 so that poppet valves, cam shafts, and other such mechanism are not required. The sleeve ports give a clean sweep for fresh scavenging air to go through the V-corners 40, 56, 57, 58 of each cylinder combination.

*The cylinder and piston action in the engine 20ᵃ
(Figs. 1, 6, 7)*

The square engine 20ᵃ, shown in Figs. 6, 7, operates in substantially the same manner as the engine 20. Its cylinders 22, 23, 24, 25 may be substantially identical to those of the engine 20, and its power take-off levers 28, 29 may also be the same. The principal differences shown are a modified form of engine jacket and a modified form of cylinder structure. The engine cylinder block may be fabricated as one piece with a separate head which bolts on at each corner 40, 56, 57, and 58.

The engine jackets 75, 75 and 76, 76 respectively jacket the intake sleeve ports 50, 50 and the exhaust sleeve ports 51, 51. While the cam 70 is shown mounted on the lever 28 and the injectors 72 are shown with a longer housing to accommodate the followers 71, there is no difference whatever in general structure and operation here. Operation remains the same as for the engine 20. The engine block of Fig. 6 may be of one casting, while that of Figs. 2 to 4 includes four castings bolted at the center of the cylinder.

The pistons 77 differ from the pistons 26, 27 in being unitary and double-acting, with two ends 78, 79 instead of two separate members. The pistons 77 are connected to the levers 28, 29 by links 80, with stub shafts 81 and 82 journaled respectively in the piston 77 and lever 28 or 29. The cylinder is hollowed to permit the necessary rotational swing of the links 80.

There are eight bearings with radial loads as follows: one bearing on each of the four stub shafts 81 and one bearing on each of the four stub shafts 82.

*The oscillating shafts 30 and 31*

It will be noted that unlike a conventional piston engine, where the reciprocating motion of the piston is converted into unidirectional rotation by means of a crankshaft and connecting rod, etc., in this invention the reciprocating motion of the pistons 26, 27 (or 77) is transmitted as an oscillating rotation to a pair of power shafts 30, 31. This oscillating shaft power may be delivered directly to a fluid pump (Figs. 7 and 8) or to an electric generator (Fig. 9) or to a magnetic clutch (Fig. 10), or to a piston compressor (Figs. 1 and 12).

As shown in the drawings, the lever 29 is fastened to and pivoted with the hollow shaft 31. The shaft 30 is inside the hollow shaft 31 and is fastened to the lever 28 which fits through a hole 85 in the lever 29, so that the lever 28 pivots with the shaft 30. Ball or needle bearings 86 are preferably provided at suitable locations.

The shaft 30 and the hollow shaft 31, 31 are synchronized by means of gears 87, 88, and 89 (Figs. 7 and 9). The gear 87 fastens to a hollow-shaft spline 90, and the gear 89 fastens to the shaft 30 at a spline 91. The pinion gear 88 has its bearings 92 on the engine structure. The gears 87, 88, and 89 are indexed and meshed so that the piston engines will have the correct motion with respect to each other and with respect to the cylinder structure, as previously explained. The shafts 30, 31 are thus phased 180° apart, and the gears are so meshed that the opposing pistons 26, 26 and 27, 27 come together symmetrically at each corner.

The engine piston link or connecting rod 80 of Fig. 6 and the engine piston toggle connecting rods 60, 61 of Fig. 2 exert less than 10 percent of their side loads on the cylinders as compared with a conventional crank-and-rod engine. The engine pistons transmit a pure torque load through them to the engine power levers 28, 29; consequently, there will be no radial bearing loads on the synchronous gear mechanism or on the torque converter mechanism. It will be noticed that the engines are double-acting and two-stroke so that they weigh much less than a single-acting four-stroke engine would weigh.

*An alternating current generator (Fig. 9)*

The engine may be used as an A.-C. generator by having the shaft 30 rotate a wheel 93, while a wheel 94 is counter-rotated by the shaft 31, as in Fig. 9. Both wheels 93 and 94 mount a plurality of permanent or electromagnets 93′, 94′. Suitable brushes are provided for the power take-off and alternating current will be produced in cycle with the engine.

*The torque converter of Fig. 7*

The oscillating motion of the two counter-rotating shafts 30 and 31 may be converted into rotation in one direction by means of two counter-oscillating pumps and turbines and a unidirection turbine, as shown in Figs. 7 and 8.

The two counter-oscillating shafts 30 and 31 supply pulsating power to two counter-oscillating centrifugal pumps 100, 101 which are rigidly mounted respectively on the shafts 30, 31. A hollow radial-flow unidirectional turbine 102 is mounted rigidly on a completely separate take-off power shaft 103 and has an annular portion 104 lying beyond and radially in line with the pumps 100, 101. The portion 104 has a radial partition 105 dividing it into two rows of axially divided buckets 106, 107, one in line with each pump. A stator 108 has guide vanes 109 for turning the radially outward discharge from the turbine 102 through approximately 180° so that the fluid will re-enter the turbine 102 on the other row of buckets.

Referring to Fig. 8, when the shaft 30 rotates counterclockwise, the shaft 31 rotates clockwise, and vice versa. Under these conditions, the pump 101 acts as a centrifugal fluid pump or compressor, and fluid flows radially outwardly impelled between its vanes 110 and discharges from the tip of the vanes 110 into the turbine buckets 107. It flows radially outwardly through the buckets 107 and is discharged from them into the guide vanes 109. There it is turned approximately 180° and directed radially inwardly into the turbine buckets 106. The flow of this fluid through the turbine buckets 107 and 106 converts its kinetic energy into power for driving the shaft 103. The radially inward discharge from the turbine bucket 106 is directed into the centripetal pump or turbine 100, which acts as a turbine under the rotation conditions just set forth.

When the shafts 30 and 31 reverse, the shaft 30 rotates clockwise while the shaft 31 rotates counterclockwise. Under these conditions, the pump 100 acts as a centrifugal fluid pump or compressor and fluid flows radially outwardly and discharges from the tip of its vanes 111 into the turbine buckets 106 where it flows radially outwardly. The discharge from the buckets 106 is directed into the guide vanes 109 where it is turned approximately 180° and directed radially inward into the turbine buckets 107. The flow of this fluid through turbine buckets 106 and 107 converts its kinetic energy into power for driving the shaft 103 in the same direction as before. The radially inward discharge from the turbine bucket 107 is directed into the centripetal pump 101 which acts as a turbine under these rotation conditions.

Thus the counter oscillation of the power shafts 30 and 31 is converted into power in one direction in the shaft 103.

A magnetic-clutch type of torque converter

The counter-oscillating motion shaft power of the two shafts 30, 31 may be converted into unidirection power by means of a pulsating magnetic clutch, using magnetic particles in a fluid between the clutch discs (Fig. 10).

The electromagnetic clutch may comprise a housing member 120 with two discs 121, 122 and two disc-shaped enclosed cavities 123 and 124. The housing 120 drives a unidirectional shaft 125, which may be mounted in a roller bearing 126. The housing 120 may be mounted on the shaft 31 with a roller bearing 127 and a fluid seal 128 of any suitable type.

A clutch disc 130 with an electromagnet 131 thereon is fastened rigidly to the shaft 30, revolves in the cavity 123, and faces an electromagnet 132 on the clutch disc 121. A clutch disc 133 with an electromagnet 134 thereon is fastened rigidly to the shaft 31, revolves in the cavity 124, and faces an electromagnet 135 on the clutch disc 122. An oil-and-metallic-dust solution 136 of magnetic particles forms a thin fluid film between these magnetic plates 131, 132 and 134, 135.

An electric power source 140 (or E.M.F.) provides electric energy for the electromagnets. A contact switch arm 141 is connected to the E.M.F. 140 by a lead 142 and is positioned between two terminals 143 and 144. The switch 141 is rigidly secured to a cam follower 145 which is urged to the right in Fig. 10 by a torsion spring 146. Both the switch 141, cam follower 145, and spring 146 are mounted on a short shaft 147 that is journaled in a bracket 148 of a housing 150. A cam 151 is secured to and oscillates with the shaft 31. This cam 151 moves the follower 145 and thereby the switch 141. When the switch arm 141 is in contact with its terminal 143, current from the E.M.F. 140 passes via a lead 152 to a brush 153 on the stationary housing 150. The brush 153 is in contact with a slip ring 154 on the shaft 31 and is connected by a lead 155 to a brush 156. The brush 156 contacts a slip ring 157 on the shaft 30 and passes current to a lead 158, which is connected to the electromagnet 131. A lead 159 from the other side of the electromagnet 131 is connected to a slip disc 160 on the end of the shaft 30. A similar disc 161 on the housing 120 passes the current via a lead 162 to the electromagnet 132. From there a lead 163 joins a lead 164, which goes to a slip ring 165. A brush 166 in contact with the slip ring 165 is connected by a lead 167 to a brush 168. A slip ring 169 on a member 170 (which is splined to the shaft 31) is connected by a lead 171 to a brush 172. A slip ring 173 on the shaft 31 contacts the brush 172 and is connected by a lead 174 to another slip ring 175. A brush 176 on the housing 150 contacts the ring 175 and is connected by a lead 177 to the opposite side of the E.M.F. 140.

When the cam 151 forces the switch 141 into contact with the terminal 144, current from the E.M.F. 140 flows from lead 142 to a lead 180 and thence to a brush 181. A slip ring 182 on the shaft 31 contacts the brush 181 and is connected to the electromagnet 134 by a lead 183. The other end of the electromagnet 134 is connected by a lead 184 to a slip ring 185. A brush 186 on the housing 120 contacts the ring 185 and a lead 187 connects it to the electromagnet 135. A lead 188 connects the electromagnet 135 to the lead 164 and thence, as before, to the opposite side of the E.M.F. 140.

A governor mechanism 190 and 194 may be used to regulate the current so that it will flow only when the unidirection shaft 125 and the counter-rotating shafts 30, 31 are rotating at the same speed. This governor 190 preferably consists of a weight and lever mechanism 191 to operate a slide brush switch 192, carrying the elements 166, 167, and 168. A spring 193 may regulate the speed at which the slide brush switch 192 will move to another position. Also, a weight and lever mechanism 194 may operate another slide brush switch 170, the force of the spring 195 regulating the speed at which the slide brush switch 170 will move to another position. The two governors 190 and 194 are adjusted so that the brush 168 will contact the slip ring 169 only when the shaft 31 and the housing 120 are rotating at the same speed.

The cam 151 guides the follower 145 so that it will direct the flow of current from the switch 141 to the terminals 143 or 144.

Operation of the clutch converter

When shafts 30 and 31 rotate in one half-cycle, say from B to A, the cam 151 forces the switch 141 to contact the terminal 144. Thus the line circuit from the current source 140 through the electromagnets 134, 135 is complete and, when the governor mechanisms 190 and 194 are at the set speed for completing the circuit, electric current will flow through them. The electromagnetic disc clutch 122, 133 will then be energized to transmit torque to the unidirection shaft 125. The magnetic dust particles 136 in the oil solution form a relatively rigid clutch contact when the fields surrounding the electromagnets 134, 135 are magnetic. During this phase of power transmission, the disc, the clutch, discs 122, 133 rotate in the same direction and at substantially the same speed. At the same time the disc-clutch 121, 130 is counter-rotating, but there is no torque contact, because the electromagnetic field then is not energized.

As illustrated by the time-speed chart, Fig. 11, there is no torque transmitted from $T_0$, $T_1$ while the shafts are accelerating up to rotating speed $N_1$. Then there is torque contact in the clutch from time $T_1$ to $T_2$ while the shafts are rotating at substantially the same speed. When the shafts 30, 31 decelerate from time $T_2$ to $T_3$, there is no torque contact between the clutches.

When the shaft 31 completes its oscillation in one direction from B to A, the torsion spring 146 will force the switch arm 141 to snap back through its neutral position and the cam 151 will force the mechanism to move and contact the terminal 143. Then the shafts 30, 31 will rotate in the opposite direction from A to B, and the line circuit through the electromagnets 131, 132 is complete. When the governor mechanisms 190 and 194 are actuated at the set speed to complete the circuit, electric current will flow through the electromagnets, engaging the clutch. Thus the power circuit is complete and the electromagnetic disc clutch 131, 132 will be energized to transmit torque to the unidirection shaft 125. The magnetic dust particles 136 in the oil solution form a relatively rigid clutch contact when the field surrounding them is magnetic. During this phase of the power transmission, the disc clutches 121 and 130 are rotating in the same direction and at substantially the same speed while they are in contact. At the same time, the disc clutch 122, 133 is counter-rotating, but there is no torque contact because the electromagnetic field surrounding the metallic fluid solution 126 is not energized.

When the shaft 31 completes its oscillation from A to B, the torsion spring 146 will force the switch mechanism 141 to snap back through its neutral position, and the cam 151 will force it to move and contact the terminal 144. The cycle is completed and will repeat itself.

The compressor 21

The cylinder and piston arrangement of the compressor 21 in Fig. 12 is the same as the cylinder and piston arrangement of Fig. 6 with the following exceptions and additions: The fuel injector and its mechanism is eliminated. The engine cylinders have only intake sleeve ports 50 and 51. At each square corner 40, 56, 57, and 58, there are intake check valves 198, 203 which seat into ports 199, 204; also there are high pressure check valves 196, 202 which seat into ports 197 and 201.

Operation of the compressor 21 is as follows: When the pistons 77 move toward corners 40 and 57, air is compressed in the cylinder until its pressure is sufficient to open check valves 196; so the compressed air can flow from the cylinder through port 197 to the line and accumulator 200. This compressed air may be used as desired. At the same time check valves 198 open, so that atmospheric air can flow through ports 199 into the compressor cylinders at corners 56 and 58.

When the square engine 20ª of Fig. 1 forces the compressor pistons 79 to move toward corners 56 and 58, air is compressed in the cylinder until its pressure is sufficient to open check valves 202; so the compressed air can flow from the cylinder through port 201 to the line and accumulator 52. This compressed air may be used to supercharge the engine 20ª of Fig. 1 or as desired. At the same time check valves 203 open so that atmospheric air can flow through ports 204 into the compressor cylinders at corners 40 and 57.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A free-piston engine, comprising four cylinders arranged as the sides of a parallelogram and connected at the corners thereof by combustion chambers; air intake and air exhaust passages leading to the cylinders; free-piston means in said cylinders for alternately compressing air toward each end of the cylinders; a pair of levers pivoted at the center of the parallelogram and connected at their outer ends to the piston means of parallel cylinders; a rocking shaft connected to each said lever and synchronized 180° out of phase, so that the piston means closest to each combustion chamber move symmetrically toward each other and away from each other to produce rocking shaft power, said levers and rocking shafts following said free-piston means with free oscillations whose amplitude varies with the engine gas pressure; and fuel injectors at said combustion chambers actuated when the associated piston means are closest thereto.

2. A free-piston engine, comprising four cylinders arranged as the sides of a square and connected at the corners thereof by combustion chambers, each cylinder having sleeve ports therethrough; jackets around said cylinders providing air intake and air exhaust passages connected to said sleeve ports; piston means in said cylinders for alternately compressing air toward each end of the cylinders, said piston means uncovering one set of said ports at each end of their expansion stroke and covering them at other times; a pair of levers pivoted at the center of the square and connected at their outer ends to the piston means of parallel cylinders; a rocking shaft connected to each said lever and synchronized 180° out of phase so that at each corner the piston means alternately move toward each other and away from each other; cam means on said levers; and fuel injectors at said combustion chambers actuated by said cam means.

3. A free-piston engine, comprising four cylinders arranged in a square with combustion chambers at the corners, each cylinder having air intake and air exhaust means and fuel injection means; free-piston means reciprocatable in said cylinders; means synchronizing said free-piston means so that those in opposite parallel cylinders move symmetrically and parallel to each other but in the opposite direction and those in adjacent cylinders move toward each other at a corner and then away from each other, these said means also synchronizing said fuel injection means with said free-piston means; a pair of rocking shafts each connected to the free-piston means of opposite cylinders and synchronized 180° out of phase, said levers and rocking shafts following said free-piston means with free oscillations whose amplitude varies with the engine gas pressure; and free-motion, freely variable stroke torque converting means for changing the opposite oscillations of said shafts into unidirectional power without affecting the stroke of said free-piston means.

4. The engine of claim 3 wherein the rocking shafts and the piston means are synchronized 180° out of phase by a gear on each rocking shaft joined by a spur gear.

5. The engine of claim 3 wherein the rocking shafts and the piston means are synchronized 180° out of phase by a lever on each shaft, said levers being fastened by separate links to the opposite ends of a third lever that is pivoted at its center.

6. A free-piston compressed gas generator comprising: a free-piston engine having four cylinders arranged as the sides of a parallelogram and connected at the corners thereof by combustion chambers, each cylinder having sleeve ports therethrough, jackets around said cylinders providing air intake and air exhaust passages connected to said sleeve ports, power free-piston means in said cylinders for producing two-cycle power alternately at each end of said cylinders, said free-piston means uncovering one set of said ports at each end of their expansion stroke and covering them at other times, a pair of levers pivoted at the center of said parallelogram and connected at their outer ends to the piston means of parallel cylinders, a rocking shaft connected to each said lever and synchronized 180° out of phase, so that at each corner said free-piston means alternately move toward each other and away from each other, cam means driven by said levers, and fuel injectors at said combustion chambers actuated by said cam means; and a separate free-piston compressor having four cylinders arranged as the sides of a second parallelogram and connected at the corners by common chambers and having inlet ports with check valves and outlet ports with check valves, compressor free-piston means in said compressor cylinders, a pair of levers for said compressor free-piston means connected to respective said rocking shafts for synchronizing and driving said compressor-free-piston means to approach their common corners at the same rate of speed and to part symmetrically.

7. The device of claim 6 wherein ducts connect said compressor outlet ports to said engine air intake passages, whereby said engine drives said compressor and said compressor provides air to scavenge, supercharge, and air-cool said engine as well as supplying compressed fluid for power.

References Cited in the file of this patent

UNITED STATES PATENTS

| | | |
|---|---|---|
| 646,031 | McKinnon | Mar. 27, 1900 |
| 1,212,476 | Goodridge | Jan. 16, 1917 |
| 1,242,685 | Guptail | Oct. 9, 1917 |
| 1,562,263 | Sommer | Nov. 17, 1925 |
| 1,821,139 | Bullington | Sept. 1, 1931 |
| 1,909,831 | Jensen | May 16, 1933 |
| 2,226,137 | Pool | Dec. 24, 1940 |
| 2,245,326 | Buchi | June 10, 1941 |
| 2,350,626 | Mahan | June 6, 1944 |
| 2,413,957 | Daub | Jan. 7, 1947 |
| 2,417,894 | Wayland | Mar. 25, 1947 |
| 2,655,001 | Napoli | Oct. 13, 1953 |
| 2,673,449 | Roberts | Mar. 30, 1954 |

FOREIGN PATENTS

| | | |
|---|---|---|
| 28,589 | Great Britain | Feb. 4, 1904 |
| 117,684 | Great Britain | July 29, 1918 |
| 1,142,142 | France | Mar. 25, 1957 |